2,913,117
FLOATING SKIMMER

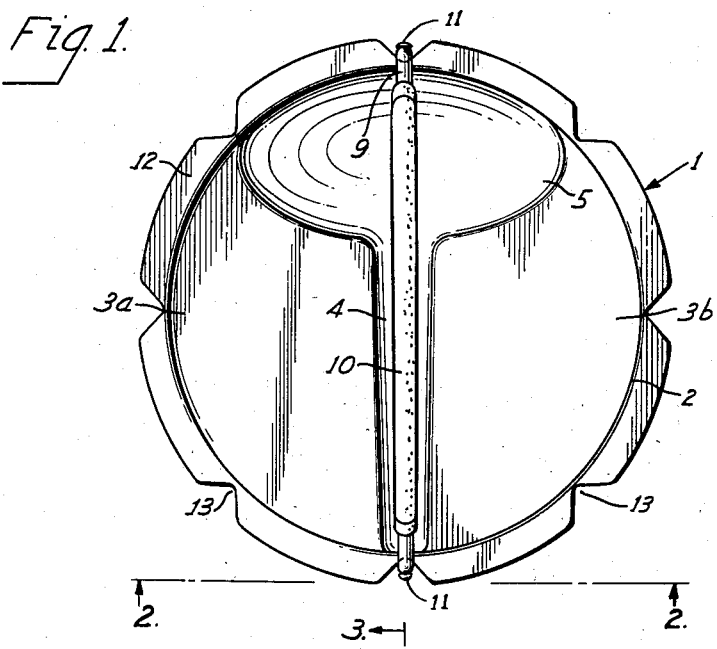
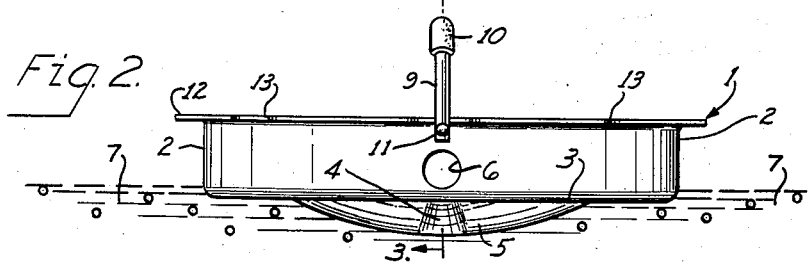
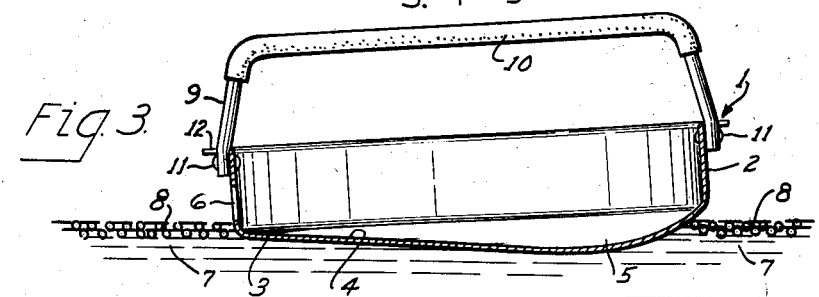
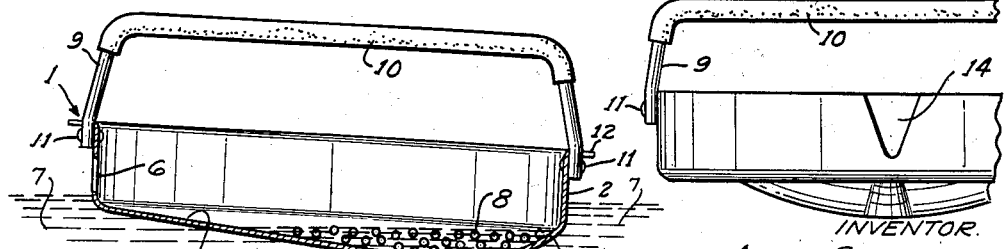

Alex Gould, Cleveland, Ohio, assignor to G & S Metal Products Co., Inc., Cleveland, Ohio, a corporation of Ohio Application January 13, 1958, Serial No. 708,425

11 Claims. (Cl. 210—242)

This invention relates to a floating skimmer, particularly a floating fat skimmer for culinary use.

Wherever food is prepared, the tendency of fat globules to form a supernatant layer on gravies, soups, stews and the like presents a problem for the cook, who for the most part does not want the fat to remain in or on the food. Its removal can be effected in several ways, as by decanting off liquid fat, removing it by means of a spoon, ladle or the like, or allowing the food to cool until the fat has solidified sufficiently to permit of its removal in solid form. These and like methods of separating the fat all have objections, the usual objection being that the separation is time-consuming, either in the sense that the cook must spoon off fat a little at a time or wait for it to congeal. The operation of removing the fat usually is imperfect in consequence of the fact that part of the food itself is likely to be removed with the fat.

The present invention consists in and has for its principal object the provision of a floating fat skimmer of a kind which the cook may place on the surface of gravy, soup or a similar product in the expectation that the skimmer will operate in and of itself; i.e., without manual assistance, to trap the fat. The invention further consists in and has for an object the provision of a floating skimmer which, after the cook has once placed it on the gravy, soup or other product, will function automatically in the sense that it will take on supernatant fat, adjust to a different position, and continue to float without danger of sinking. The invention also consists in and has for a specific object the provision of a floating skimmer which when empty of fat tends to float in fat-collecting position and which, when charged with fat, tends to float in fat-rejecting position on the surface of the food on which it is being used.

Other objects, advantages and features of the invention will be apparent from the specification which follows and from the accompanying drawings, in which:

Figure 1 is a top plan of a floating fat skimmer of a type within purview of the invention, Figure 2 is an elevation of the same as seen from line 2—2 of Figure 1, Figure 3 is a section of line 3—3 of Figure 2 showing the skimmer as it appears immediately before it begins to trap fat, Figure 4 is a similar section showing the skimmer in the position which it assumes after the well has filled with fat, and Figure 5 is a fragmentary view generally similar to that of Figure 2 showing a modification of the fat skimmer of Figures 1 to 4.

In Figures 1 to 5 the fat skimmer is shown on somewhat reduced scale, although it may, if desired, be of the small size shown in the drawings.

Referring first to Figure 1, the floating fat skimmer indicated generally at 1 may be described as taking the form of a pan-shaped container characterized by a wall portion 2 and a bottom portion 3. The latter is divided into two halves 3a and 3b (Figure 1) by a transverse trough 4 which extends from wall portion 2 diametrically across the skimmer to a well taking the form of a shallow depression in the bottom portion of the skimmer. Well 5, seen in outline in Figure 1, extends over approximately one quarter of the area of such bottom portion. Trough 4 is of progressively increasing depth; that is to say, its depth is at a minimum where the trough impinges on wall portion 2 and at a maximum where it opens into well 5.

In ordinary circumstances, as where it is intended for use on gravies, soups, stews and the like, the skimmer will be stamped out of aluminum sheet, although it may, if desired, be stamped or formed in other suitable fashion out of copper, brass, stainless steel or other metal. As in the case of any floating object, the skimmer tends to float somewhat lower in a liquid of low specific gravity, such as a supernatant stratum of fat, and somewhat higher in a liquid of greater specific gravity, such as a body of gravy, soup, stew or the like without any particular fat concentration at the surface. Whether it rides high or low under given circumstances depends in part on the specific gravity of the liquid with which it comes into contact and in part on the kind and gauge of metal of which it is formed.

Up to this point the skimmer has been described as if it were devoid of any opening in the wall portion thereof, as may indeed be the case in some circumstances; for example, if wall portion 2 is so formed as to be of maximum altitude where it is tangent to the well and of minimum altitude in a zone 180° removed from the point of tangency. It is preferred, however, to form the skimmer with a wall portion of uniform altitude and to provide a discrete opening for the admission of the fat in the portion appearing at the left in Figures 3 and 4. Such opening may take other forms, but in the embodiment of the invention illustrated in Figures 1 to 4 it takes a form of the circular hole 6 in wall portion 2 of the skimmer.

When the skimmer is first placed on the product on which it is used, the gravy, soup, stew or other product will ordinarily take the form of an oil-in-water emulsion as shown diagrammatically in Figure 2. As a result of the presence of trough 4 and well 5, the skimmer when empty does not ride flat on the surface but at an angle of a few degrees to the horizontal, usually about five or ten degrees. At the outset, it inclines downwardly toward the shallow end of trough 4, i.e., toward the left as seen in Figure 3, so that it appears to the eye to be plowing into the product on which it is floating. This is true regardless of whether the product contains dispersed fat, has a layer of supernatant fat or is entirely free of fat.

With time, dispersed fat globules tend to rise to the surface, where they form a supernatant layer 8 consisting largely of fat. The specific gravity of fat layer 8 is low compared with the specific gravity of the gravy, soup, stew or other product as first prepared, at which time the fat globules are dispersed. Thus as soon as supernatant layer 8 forms, the skimmer tends to float a trifle lower than before, permitting the fat of which supernatant layer 8 is formed to enter the skimmer by spilling over on the inside through opening 6. It is because of this action that in all of its various forms the skimmer may be aptly described as having a "spill zone" on the side opposite the well.

Because trough 4 increases in depth as already described, the fat entering the container through opening 6 travels from left to right as seen in Figure 3, settling to the bottom of well 5. This action continues as the fat conitnues to rise to the surface of the gravy, soup, stew or other product, so that the quantity of fat in the well increases progressively. If there is no great excess of fat on the surface of the product, all of the fat can be removed in this fashion, forming a pool of fat as shown in Figure 4. Under such circumstances, the skimmer tends first to right itself and, having done so, to list in the opposite direction; i.e., to tilt toward the right as seen in Figure 4, as the quantity of fat in well 5 increases. Ultimately, the skimmer floats in the position shown in Figure 4, in which opening 6 is above the surface of the liquid.

For convenience in manipulating the skimmer, as in placing the skimmer on the gravy, soup or other product, it is provided with a handle 9 which may be of the same material as the skimmer itself, such handle being provided with heat insulating material 10 in the form of a tube of rubber, plastic or the like. At its two ends, handle 9 is riveted as at 11 to the wall portions of the skimmer. Preferably it parallels trough 4, although, if desired, a handle of different type, such as the sort of handle conventionally used on a spoon or ladle, may be used provided the balance of the skimmer is not adversely affected. Ears of tab-like shape or loops may be used for this purpose. Because the skimmer may tend under some circumstances to adhere to the wall portions of the utensil in which it is used, it is desirable to form it with a rim 12, best seen in Figure 1. This rim may take the form of an interrupted flange and in the form of the invention shown in Figures 1 to 4 is provide with openings 13 which give it a scalloped appearance. Those portions of rim 12 between openings 13 may be described as spacing means projecting laterally from the skimmer into contact with the walls of the utensil.

In the modified form of the invention shown in Figure 5 the skimmer is in the main formed as already described, except that it lacks rim 12 and openings 13 and, rather than having a circular opening 6 in the spill zone, is provided with a V-shaped opening 14. It is evident that the notch constituting such opening need not be characterized by an included angle of approximately 45°, as is the case in Figure 5, but if desired may take the form of an opening measuring 90°, 120°, 150° or the like. In such case, the spill zone will of course be wider at the top than it is in Figure 5, but it will nevertheless be symmetrical as seen from the front. It will be noted that in the form of the invention shown in Figure 5, handle 9 does not parallel but extends transversely or at right angles to the trough in the bottom portion of the skimmer.

It is apparent that changes in the construction of the skimmer may be made by those skilled in the art. It is not necessary, for example, that the well be oval in shape after the fashion of well 5 in the above-described embodiment of the invention: it may take the form of a circular segment, in which case it will appear when viewed from above as defined by the chord and the circumscribing arc of a circle. It is not necessary that the skimmer be of a circular form; instead, it may advantageously be polygonal in shape as seen from above. Where the spill zone is notch shaped, as in the modification of the invention shown in Figure 5, the handle need not run transversely to the trough, but may, if desired, be Y-shaped with the shank portion attached to the wall portion of the skimmer at a point 180° removed from the spill zone. Other like changes may be expected of those skilled in the art.

It is intended that the patent shall cover, by summarization in appended claims, all features of patentable novelty residing in the invention.

What is claimed is:

1. A self-righting skimmer for the separation of a supernatant layer from an underlying layer comprising a container having wall and bottom portions; means forming a spill zone in the wall portion; a well taking the form of a depression in the bottom portion on the side of the container opposite the spill zone; and, interconnecting the spill zone and the well, means forming a trough in the bottom portion.

2. A self-righting skimmer as in claim 1 in which the spill zone is characterized by an opening in the wall portion of the container.

3. A self-righting skimmer as in claim 2 in which the opening in the spill zone comprises a slot in the wall portion of the container.

4. A self-righting skimmer as in claim 2 in which the opening in the spill zone comprises a hole in the wall portion of the container.

5. A self-righting skimmer as in claim 2 in which the trough increases in depth from the spill zone to the well.

6. A self-righting skimmer as in claim 5 in which the well occupies roughly one quarter of the area of the bottom portion.

7. A self-righting skimmer for the separation of a supernatant layer from an underlying layer comprising a container having wall and bottom portions; spacing means extending laterally from the wall portion; means forming a spill zone in the wall portion; a well taking the form of a depression in the bottom portion on the side of the container opposite the spill zone; and, interconnecting the spill zone and the well, means forming a trough in the bottom portion.

8. A self-righting skimmer for the separation of a supernatant layer from an underlying layer comprising a container having wall and bottom portions; grasping means on the wall portion; means in the wall portion forming a spill zone; a well taking the form of a depression in the bottom portion on the side of the container opposite the spill zone; and, interconnecting the spill zone and the well, means forming a trough in the bottom portion of the container.

9. A self-righting skimmer as in claim 8 in which the grasping means take the form of a handle of the bail type.

10. A self-righting skimmer as in claim 9 in which the handle extends in a direction transverse to the trough in the bottom portion of the container.

11. A self-righting skimmer for the separation of a supernatant layer from an underlying layer comprising a container having wall and bottom portions; grasping means on the wall portion; spacing means extending laterally from the wall portion; means in the wall portion forming a spill zone; a well taking the form of a depression in the bottom portion on the side of the container opposite the spill zone; and, interconnecting the spill zone and the well, means forming a trough in the bottom portion of the container.

References Cited in the file of this patent

UNITED STATES PATENTS 2,287,156    White    June 23, 1942